US012671254B1

(12) United States Patent　(10) Patent No.:　US 12,671,254 B1

Jankovic et al.　(45) Date of Patent:　Jun. 30, 2026

(54) POWER AND CHARGING SYSTEM FOR A MARINE VESSEL

(71) Applicant: Navico Group Americas LLC, Menomonee Falls, WI (US)

(72) Inventors: Zeljko Jankovic, Mequon, WI (US); Mark A. Maier, Grand Haven, MI (US); Andrew H. Bazan, Appleton, WI (US); Saurabh Maithani, Hartland, WI (US); Pramit Baul, North Fond du Lac, WI (US); Shradhdha Sarvaiya, Emeryville, CA (US)

(73) Assignee: Navico Group Americas LLC, Menomonee Falls, WI (US)

( * ) Notice: Subject to any disclaimer, the term of this patent is extended or adjusted under 35 U.S.C. 154(b) by 48 days.

(21) Appl. No.: 18/777,219

(22) Filed: Jul. 18, 2024

(51) Int. Cl.
| | |
|---|---|
| *B60L 53/20* | (2019.01) |
| *B60L 53/30* | (2019.01) |
| *H02J 3/02* | (2006.01) |
| *H02J 7/02* | (2016.01) |
| *H02J 7/70* | (2026.01) |

(52) U.S. Cl.
CPC ................ *H02J 3/02* (2013.01); *B60L 53/20* (2019.02); *B60L 53/30* (2019.02); *H02J 7/02* (2013.01); *H02J 7/70* (2026.01); *B60L 2200/32* (2013.01); *B60L 2210/30* (2013.01)

(58) Field of Classification Search
None
See application file for complete search history.

(56) References Cited

U.S. PATENT DOCUMENTS

| | | | |
|---|---|---|---|
| 11,518,261 | B2 | 12/2022 | Gonring |
| 2007/0273325 | A1* | 11/2007 | Krieger ............... H01M 6/5066 |
| | | | 363/142 |
| 2013/0057200 | A1* | 3/2013 | Potts ....................... H02J 50/12 |
| | | | 320/107 |
| 2022/0014036 | A1 | 1/2022 | Gonring |
| 2022/0194241 | A1* | 6/2022 | Gonring ................. B60L 53/11 |
| 2024/0162729 | A1 | 5/2024 | Karanasios |

FOREIGN PATENT DOCUMENTS

| | | | |
|---|---|---|---|
| CN | 114683846 A | 7/2022 | |
| CN | 115313450 A | 11/2022 | |
| EP | 2442398 A2 | 4/2012 | |
| IN | 202011037252 A | 3/2022 | |
| KR | 1020210018695 A | 2/2021 | |
| WO | WO-2011043813 A1 * | 4/2011 | ............. H01R 13/70 |

* cited by examiner

*Primary Examiner* — Menatoallah Youssef
*Assistant Examiner* — Aqeel H Bukhari
(74) *Attorney, Agent, or Firm* — Andrus Intellectual Property Law, LLP

(57) ABSTRACT

A vessel power system configured for a marine vessel includes a rectifier configured to receive an AC power input from a shore power source and provide a DC charging output to charge a battery and an active phase circuit configured to provide a regulated AC output to power onboard AC loads on the marine vessel. The active phase circuit is connected to the output of the rectifier and includes a return connection configured to form a return path for electric current from the onboard AC loads and configured such that the rectifier and the active phase circuit are configured to split the AC power input from the shore power source into the DC charging output to charge the battery and the regulated AC output to power the onboard AC loads.

20 Claims, 7 Drawing Sheets

POWER AND CHARGING SYSTEM FOR A MARINE VESSEL

FIELD

The present disclosure relates to power systems for marine vessels, and particularly to systems and methods for providing both DC charging and AC load supply outputs from a single power input.

BACKGROUND

The following patents and patent publications provide background and are each hereby incorporated by reference in their entirety.

U.S. Patent No. U.S. Pat. No. 11,518,261 discloses a fast charging station for charging a marine vessel battery on a marine vessel using shore power. The fast charging station includes a dock battery, a charger that is operatively coupled to a power source and the dock battery, and an enclosure located on a dock structure in a body of water. The enclosure is configured to encapsulate the dock battery and the charger. The charger is configured to charge the dock battery using the power source when the marine vessel is not docked to the dock structure. The charger is further configured to charge the marine vessel battery using the power source and the dock battery when the marine vessel is docked to the dock structure.

U.S. Publication No. 2022/0014036 discloses a marine AC generator system that includes a rectifier configured to rectify the AC current to provide a DC current. At least one battery is configured to receive and be charged by the DC current. A battery powered inverter is configured to be powered by the at least one battery and to generate a variable current output frequency such that an AC electrical power is provided to a load when the marine generator is not running.

U.S. Application No. 2024/0162729 discloses a battery that includes at least one battery cell, a bidirectional port configured to provide current output to a load from the at least one battery cell and to receive a charge current from a battery charger to charge the at least one battery cell, a charge only port configured to receive charge current from the battery charger to charge the at least one battery cell, and a battery control system. The battery control system is configured to detect a connection status of the bidirectional port and/or the charge only port and, based on the connection status of each port, to control the battery between a power delivery mode where current can flow from the at least one battery cell out of the bidirectional port, a charge mode where current can from the bidirectional port or the charge only port to the at least one battery cell, and a disconnected mode where current cannot flow between the bidirectional port or the charge only port and the at least one battery cell.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one aspect of the present disclosure, a vessel power system configured for a marine vessel includes a rectifier configured to receive an AC power input from a shore power source and provide a DC charging output to charge a battery and an active phase circuit configured to provide a regulated AC output to power onboard AC loads on the marine vessel simultaneously with the DC charging output. The active phase circuit is connected to the output of the rectifier and includes a return connection configured to form a return path for electric current from the onboard AC loads and configured such that the rectifier, the return connection, and the active phase circuit are configured to split the AC power input from the shore power source into the DC charging output to charge the battery and the regulated AC output to power the onboard AC loads.

In one embodiment, the rectifier and the active phase circuit are positioned in a device housing configured to be mounted on the marine vessel.

In another embodiment, the active phase circuit comprises a half bridge comprising at least two semiconductor power switches and is in parallel with the DC charging output from the rectifier.

In another embodiment, the active phase circuit is configured to provide the regulated AC output regardless of voltage or phase configuration of the AC power input.

In another embodiment, the regulated AC output is a single phase output at a predetermined voltage.

In another embodiment, the AC power input is a single phase 120V, 208V, 220V, or 480V input.

In another embodiment, the predetermined voltage of the regulated AC output is 120V and a predetermined frequency of the regulated AC output is 50 Hz or 60 Hz.

In another embodiment, the return connection is to one phase of the AC power input.

In another embodiment, the AC power input is a multi-phase input comprising a plurality of input phases and the return connection is connected to one of the plurality of input phases or the neutral input.

In another embodiment, the AC power input includes a neutral input and wherein the return connection is to the neutral input.

In another embodiment, the active phase circuit is configured to provide two split phase outputs, each at a predetermined voltage.

In another embodiment, the active phase circuit is controllable to vary a split of input power from the AC power input between the regulated AC output and the DC charging output. In another embodiment, the system further includes a controller configured to control a split of input power from the AC power input between the regulated AC output and the DC charging output.

In another embodiment, the controller is further configured to receive a user input indicating a user-desired power split, and wherein the controller is configured to control the split of the input power based on the user input.

According to another aspect of the disclosure, an onboard battery charger configured to be installed on a marine vessel to receive an AC power input from a shore power source and to charge at least one battery on the marine vessel includes a rectifier configured to receive an AC power input from a shore power source and provide a DC charging output to charge the battery and an active phase circuit configured to provide a regulated AC output to power an onboard AC load on the marine vessel. The active phase circuit is connected to the output of the rectifier and includes a return connection configured to form a return path for electrical current from the onboard AC loads and configured such that the rectifier and the active phase circuit are configured to split the AC power input from the shore power source into the DC charging output to charge the battery and the regulated AC output to power the onboard AC loads. The rectifier and the active phase circuit are housed in a charger housing configured to mount to the marine vessel, the charger housing comprising an input port configured to receive the AC power input, a DC output port configured to provide the DC charging output to the battery, and an AC output port configured to provide the regulated AC output to power the onboard AC load.

In one embodiment, the active phase circuit comprises a half bridge comprising at least two semiconductor power switches and is in parallel with the DC charging output from the rectifier.

In another embodiment, the active phase circuit is configured to provide the regulated AC output regardless of a voltage or phase configuration of the AC power input.

In another embodiment, the return connection is to one phase of the AC power input.

In another embodiment, the AC power input includes a neutral input and wherein the return connection is to the neutral input.

In another embodiment, the active phase circuit is configured to provide two split phase outputs, each at a predetermined voltage.

BRIEF DESCRIPTION OF THE DRAWINGS

The present disclosure is described with reference to the following Figures.

DETAILED DESCRIPTION

Figure 1:
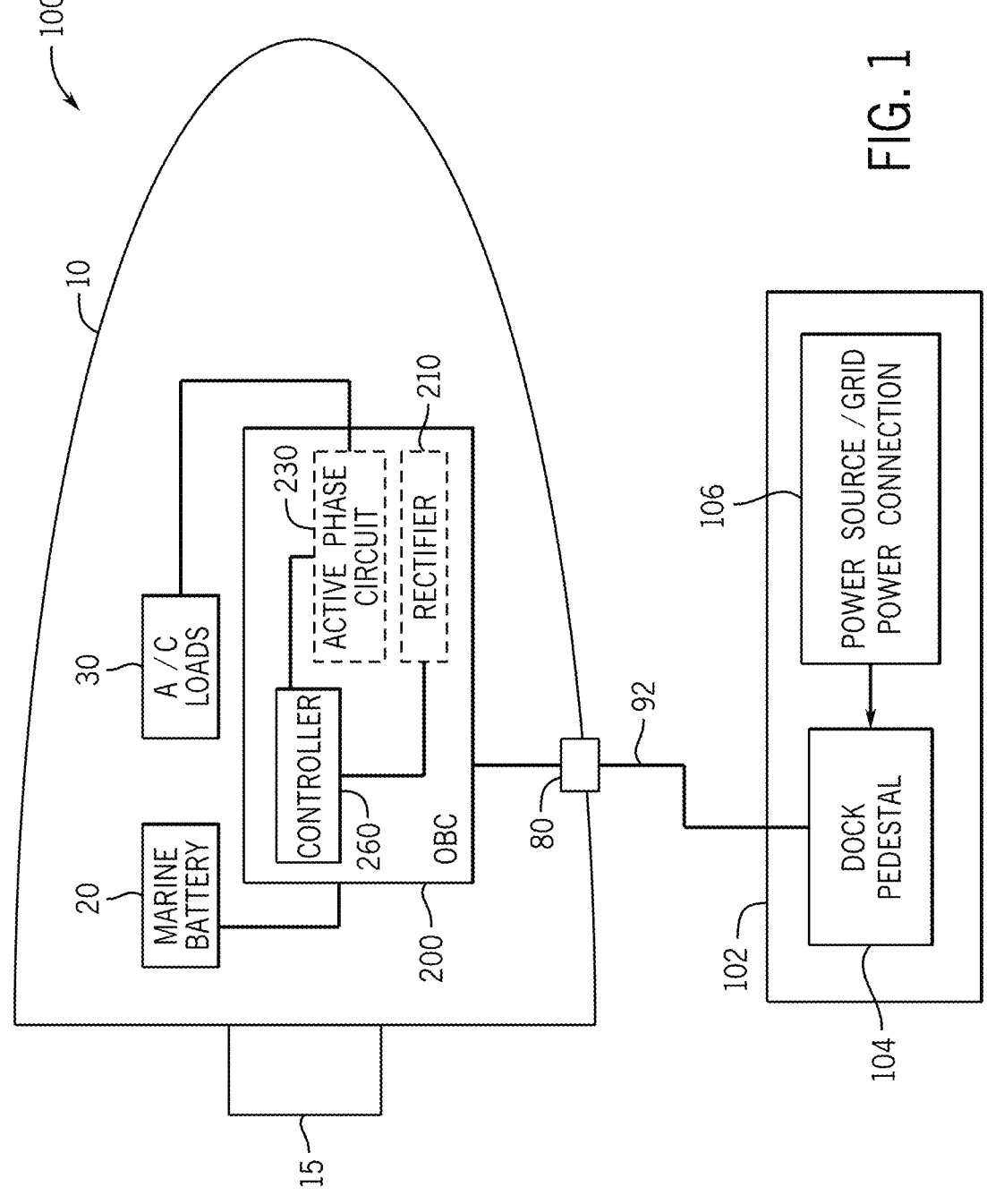
FIG. 1 is a block diagram illustrating a marine vessel charging system according to an exemplary implementation of the present disclosure.

In the present description, certain terms have been used for brevity, clearness and understanding. No unnecessary limitations are to be inferred therefrom beyond the requirement of the prior art because such terms are used for descriptive purposes only and are intended to be broadly construed.

Integrated onboard battery chargers for power storage systems on electric marine vessels do not provide an AC power supply to directly power onboard AC loads during periods of charging of the vessel power system. Existing systems are configured to only power AC loads via the battery power through an inverter. This requires discharging the battery. This becomes a limiting factor for systems having batteries that are not configured to be charged and discharged at the same time because customers often want to use AC loads on the vessel while it is docked and the battery is charging. Additionally, inclusion of an inverter for the purpose of powering AC loads while charging adds cost, weight, packaging size, and inefficiency to the battery charging system.

In view of the foregoing issues recognized by the inventors, they developed the disclosed vessel power system configured to split an AC power input from a shore power source into a DC charging output to charge a battery and an AC power supply for powering onboard AC loads. The disclosed vessel power system is more efficient and provides a cost-effective and space-saving solution for distributing the AC input power into both a battery-charging output and an AC output for operating the AC loads while the batteries are being charged. In one embodiment, the system may be configured to adjust the distribution of power between the DC and AC outputs, such as automatically based on AC power demand and/or battery charge level(s) or based on user-inputted preferences.

The power system includes a rectifier configured to provide a DC charging output and an active phase circuit configured to provide a regulated AC output that powers AC loads operating on the vessel. The active phase circuit is connected to the output of the rectifier and includes a return connection that is configured to form a return path for electric current from the onboard AC loads. The active phase circuit includes semiconductor power switches that, when operated, regulate the output voltage and form a return path for onboard single phase AC loads. The active phase circuit may be configured to provide the regulated AC output regardless of any voltage or phase configuration of the AC power input. Thus, the active phase circuit provides one or more regulated single phase outputs at a predetermined voltage, regardless of whether the AC power input is single phase or multi-phase and regardless of the voltage level of the AC power input. For example, in one embodiment the active phase circuit is configured to provide a single phase regulated 120V AC 50 Hz or 60 Hz output regardless of whether the AC power input is a 120V, 208V, 220V, or 480V input.

The active phase circuit may be integrated into a single device housing with the rectifier, such as within the housing of an onboard charger (OBC) configured to be installed on a marine vessel. The housing may be configured with input connection points to receive input connections configured to deliver the AC power input and provide output connection points to wires or cables carrying each of the DC charge current to the battery and the regulated AC output to the AC loads. Thus, the housing may include an input port configuration to receive the AC power input, a DC output port configuration to provide the DC charging output to the battery, and an AC output port configuration to provide the regulated AC output to power the onboard AC load.

FIG. 1 depicts a block diagram of a vessel power system 100 according to an exemplary implementation of the present disclosure. The vessel power system 100 is installed on marine vessel 10, which is shown connected to a shore power source 106 via a dock pedestal 104 connected to a dock structure 102 located in a body of water. The marine vessel 10 may be any type of watercraft that includes a rechargeable DC battery 20 and a marine vessel AC load 30, and may include a propulsion device 15 powered by the rechargeable DC battery (e.g., an electric motor) or otherwise associated with the rechargeable battery (e.g., an internal combustion engine having an electric starter and/or other battery-powered components). The dock pedestal 104 and the shore power source 106 are an exemplary AC power source utilized to charge the marine vessel battery 20 on the marine vessel 10, as well as to power AC loads as disclosed herein. Although the AC power supply is illustrated as a charging dock pedestal 104 connected to a shore power source 106 configured to charge floating vessels that are docked, in other embodiments the AC power source may not be on a dock and may instead be configured to provide an AC power supply by other connection means, such as a standard wall outlet positioned to charge a trailered vessel.

The vessel power system 100 is connected to the shore power source (here, at the dock pedestal 104) via charging cable 92, such as to a charge port 80 on the vessel 10. An onboard charger (OBC) 200 on the vessel 10 is configured to receive the AC power input from the charge port 80 and to supply a DC charging output to charge the marine battery 20 (which in various embodiments may include multiple batteries, such as a battery bank), as well as a regulated AC output to power the onboard AC load 30 simultaneously while the battery 20 is being charged. The AC load 30 on the marine vessel may include any device(s) on the vessel powered by the AC power output. For example, the marine vessel AC loads 30 may include, but are not limited to, user interface displays, audio systems, windlasses, depth finders, air conditioning, appliances, and charging personal consumer electronics (e.g., phones and laptops).

The OBC 200 includes a rectifier 210 configured to provide a DC charging output to charge a marine battery 20. The active phase circuit 230 is configured to connect to the output of the rectifier 210 and provide a regulated AC output to power onboard AC loads 30 on the marine vessel 10. Here, the active phase circuit is incorporated into the OBC 200 (i.e., provided in the same housing). While in some embodiments it may be preferable to package the rectifier circuitry and the active phase circuit with the OBC (i.e., in the same enclosure), such as for space saving and efficiency reasons, in some applications the active phase circuit 230 may be housed separately from the rectifier and other aspects of the OBC 200 configured to generate the DC output.

The rectifier 210 and the active phase circuit 230 are configured to split the AC power input from the shore power source 106 into the DC charging output to charge the battery 20 and the regulated AC output to power the onboard AC loads 30. In one embodiment, a controller 260 may control the rectifier and/or elements of the active phase circuit to facilitate the balance or proportionality of the division of power between the DC charging output and the regulated AC output.

Figure 2:
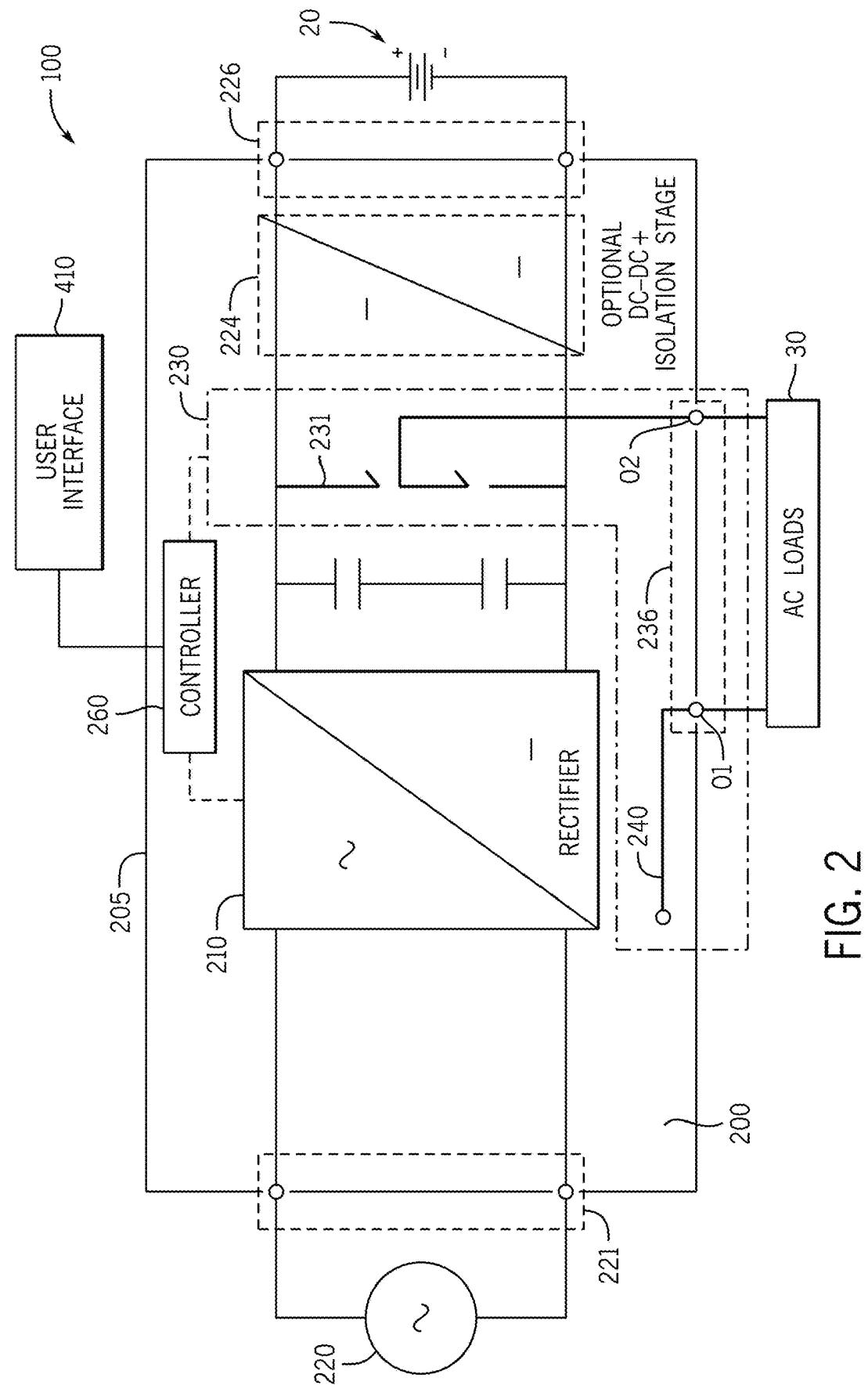
FIG. 2 is a block diagram of a vessel power system with an exemplary onboard battery charger, according to one embodiment of the present disclosure.

FIG. 2 illustrates another embodiment of power system 100 comprising an exemplary active phase circuit 230. The active phase circuit 230 is connected to the output of the rectifier 210 and configured to provide a regulated AC output to power. The active phase circuit 230 includes an active leg 231 and a return connection 240 configured to form a return path for current from the onboard AC loads 30. The return connection 240 may connect at a plurality of locations within the vessel power system such as a connection to one phase input of the AC power input, a neutral input of the AC power input, or to a midpoint of the capacitor bank between the outputs of the rectifier 210. As illustrated and discussed further herein, if the AC power input is single phase, then the return connection 240 may be connected to one of the single phase inputs. If the AC power input is a multi-phase input, then the return connection 240 may be connected to any of the plurality of input phases.

The active phase circuit 230 is configured to provide the regulated AC output regardless of a voltage or phase configuration of the AC power input 220, which may variously be a single phase or multi-phase 120V, 208V, 220V, or 480V input. In one embodiment, the regulated AC output is a single phase output at a predetermined voltage. For example, the predetermined voltage of the regulated AC output may be 120V and a predetermined frequency of the regulated AC output is 50 Hz or 60 Hz, regardless of whether the AC power input from the AC power source 220 is 120V, 208V, 220V, 480V, a single phase input, or a 3 phase input. The regulated AC output is provided at output connections O1 and O2 connecting to the return leg 240 and the active leg 231, respectively.

In one embodiment, the active phase circuit 230 may be housed together with the rectifier 210 in a housing 205 of the OBC 200. While the figures show embodiments comprising the active phase circuit 230 housed together with the rectifier 210, in other embodiments, the active phase circuit 230 may be housed separately from the rectifier 210 and such embodiment are contemplated by the inventors and within the scope of the present disclosure. In the depicted example, the charger housing 205 includes an input port 221, a DC output port 226, and an AC output port 236. The input port 221 is configured to receive the AC power input, such as to be electrically connected to the charge port 80 which receives power from the AC power source 220. The DC output port 226 is configured to provide a connection for the DC charging output to the battery 20. The AC output port 236 is configured to provide a connection for the regulated AC output to provide power to the onboard AC load 30.

The vessel power system 100 may include a controller configured to control the rectifier 210 and/or the active phase circuit 230 to control a split of input power from the AC power input between the regulated AC output and the DC charging output based on one or more factors, such as based on user input, based on AC power demand, and/or based on the charge level of the one or more batteries on the marine vessel. Namely, the controller controls the semiconductor power switches by adjusting their switching frequency and the duty cycle. This is accomplished by varying the gating signals sent from the controller to the semiconductor power switch. For example, the vessel power system 100 may be configured to receive a user input via a user input device 410, such as the depicted user interface, indicating a user-desired power split, and wherein the controller is configured to control the split of the input power based on the user input. For example, the user input device 410 may be any of various user interface devices, which may be a digital user interface presented on an interactive screen, such as a touchscreen at the helm, for example, or may be a knob, lever, sliding gauge, or dial on the exterior of the OBC housing 205 or at the helm, as non-limiting examples.

Figure 3:
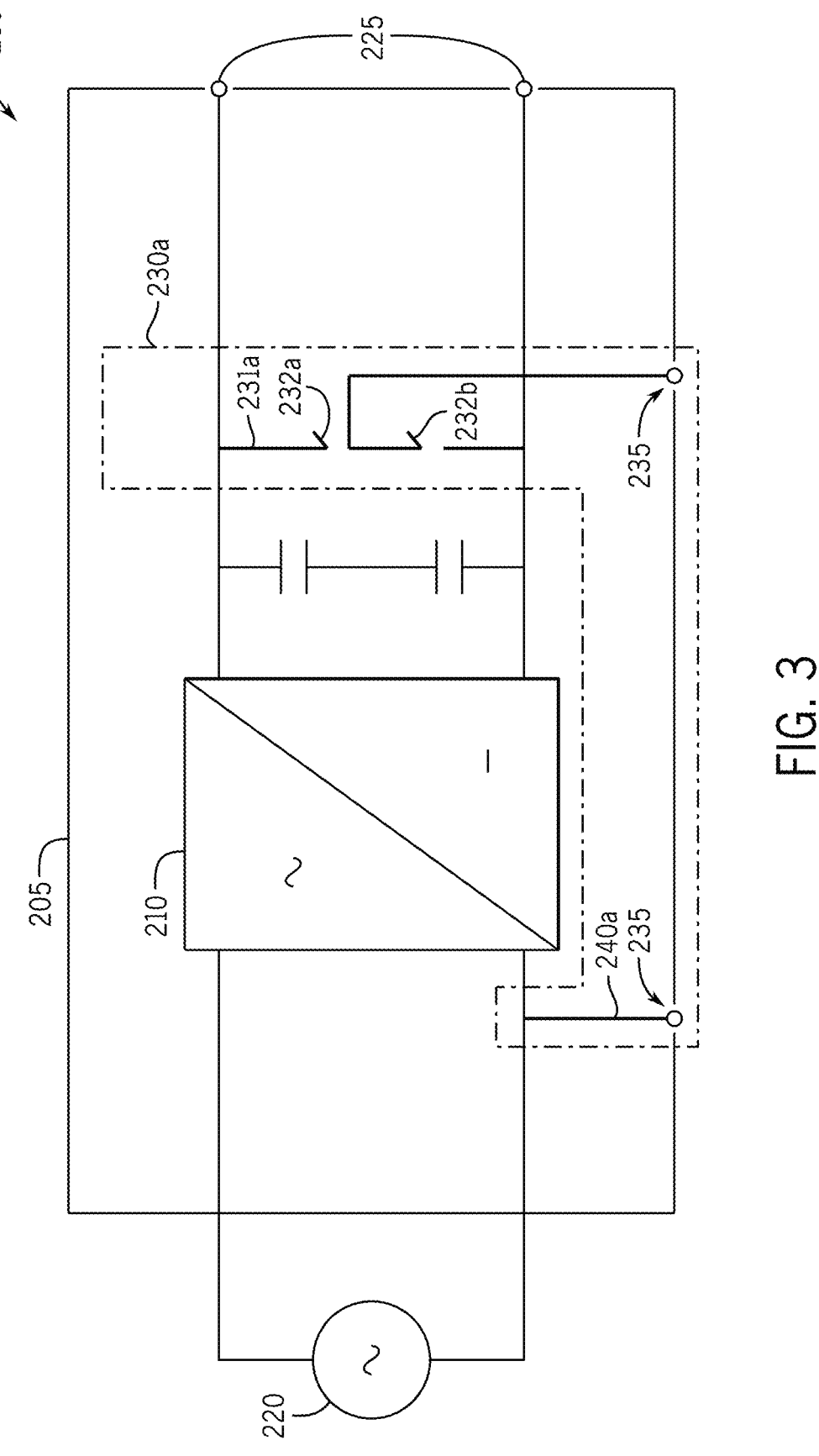
FIG. 3 is a block diagram of a vessel power system with an exemplary onboard battery charger configured to generate a regulated AC output and a DC charging output according to one embodiment of the present disclosure.

FIG. 3 illustrates one embodiment of an onboard battery charger (OBC) 205 comprising an exemplary active phase circuit 230a configured to generate a regulated AC output across output points 235 and a DC charging output across output points 225 (i.e., a DC output to charge a battery connected thereto) from a single phase AC power input 220. In the depicted embodiment, the active phase circuit 230a comprises an active phase leg 231 comprising two semiconductor power switches 232a and 232b. In various embodiments, the semiconductor power switches may each be a BJT, a MOSFET, a diode, or IGBT, as a non-limiting list of examples. These types of semiconductor power switches may be used in conjunction with each other, such that the active phase circuit 230 may include two different types of semiconductor power switches and may include two or more switches with a neutral point connection, a plurality of clamping diodes, or a plurality of switches with a flying capacitor, as a non-limiting list of examples. The semiconductor power switches are sufficient to regulate the AC output provided to output points 235, regardless of the particular configuration.

Figure 4:
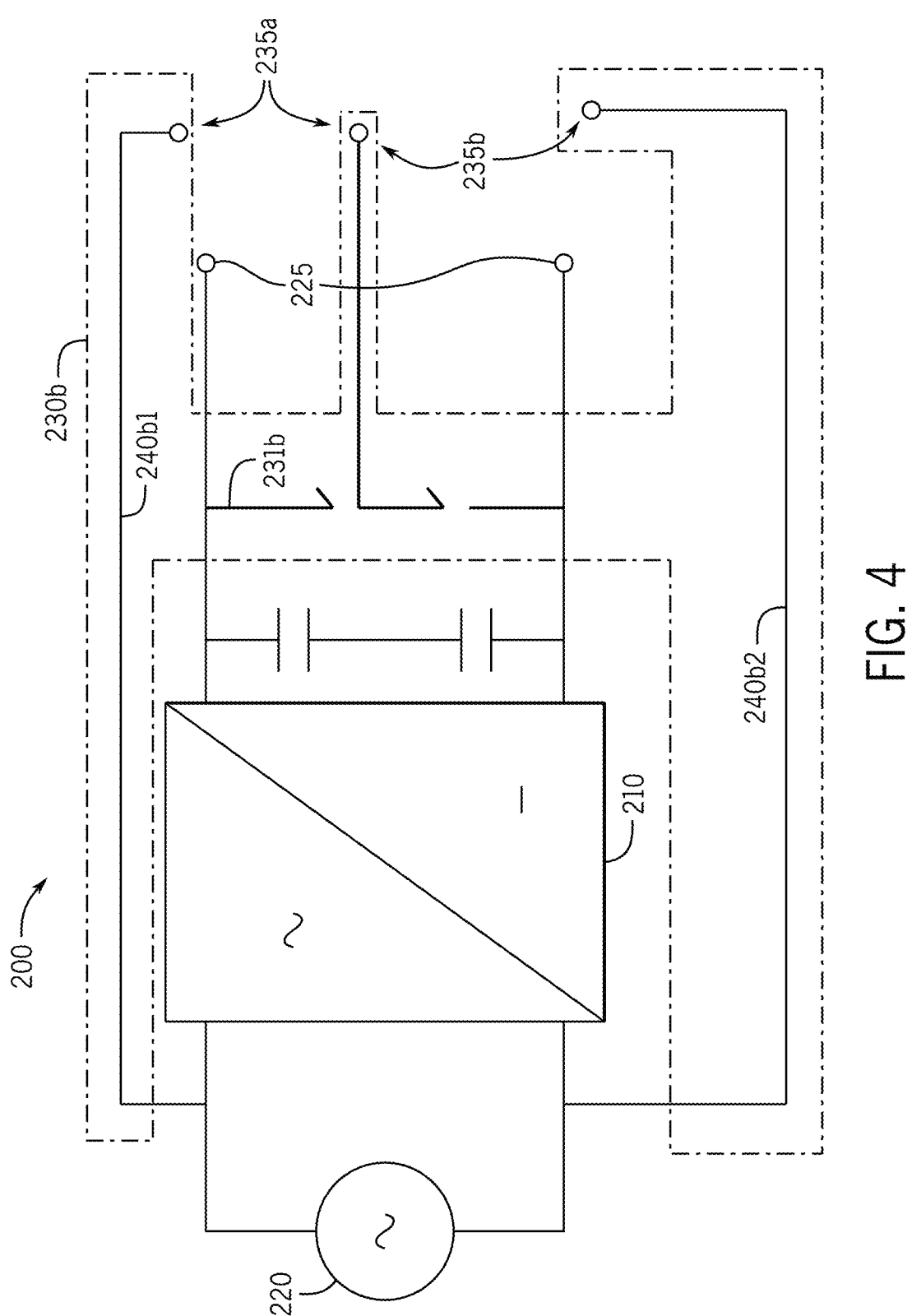
FIG. 4 is a block diagram of a vessel power system with an exemplary onboard battery charger configured to generate a split phase regulated AC output and a DC charging output according to another embodiment of the present disclosure.

FIG. 4 illustrates an embodiment of an OBC comprising another exemplary embodiment of an active phase circuit 230b. Here, the active phase circuit 230b is configured to provide a DC charging output across output points 225 and two split phase AC outputs across points 235a and 235b, where each of the split phase AC outputs are at the same predetermined voltage. Depending on the configuration of the vessel power system and the input power configuration, the split phase outputs provided across points 235a and 235b could be a split phase output from a single phase AC power input 220, as shown, or could be a split phase output from a multi-phase AC power input. The active phase circuit 230b includes two return connections 240b1 and 240b2, one connecting to each phase leg (L1 and L2) of the single phase AC power input 220. Each return connection 240b1 and 240b2 is paired with the active phase leg to create two split phase regulated AC outputs across each of the two output points 235a and 235b. Where the input is a multi-phase input, any two input legs of the multi-phase input (e.g., L1, L2, L3, and neutral input N shown in FIG. 5) may be utilized to create the two AC outputs.

Figure 5:
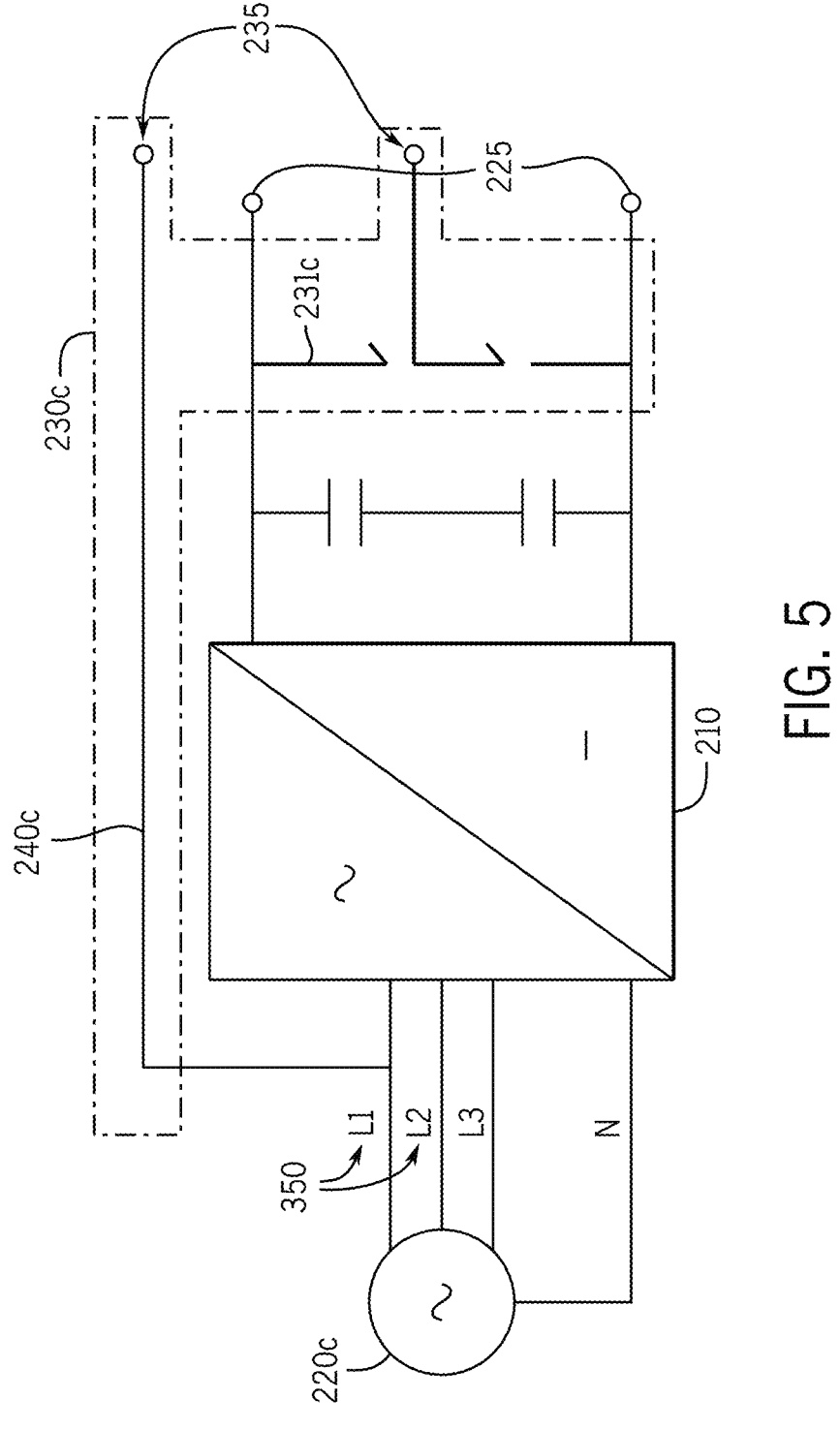
FIG. 5 is a block diagram of a vessel power system with an exemplary onboard battery charger configured to receive a multi-phase AC power input and generate a regulated AC output and a DC charging output according to another embodiment of the present disclosure.
Figure 6:
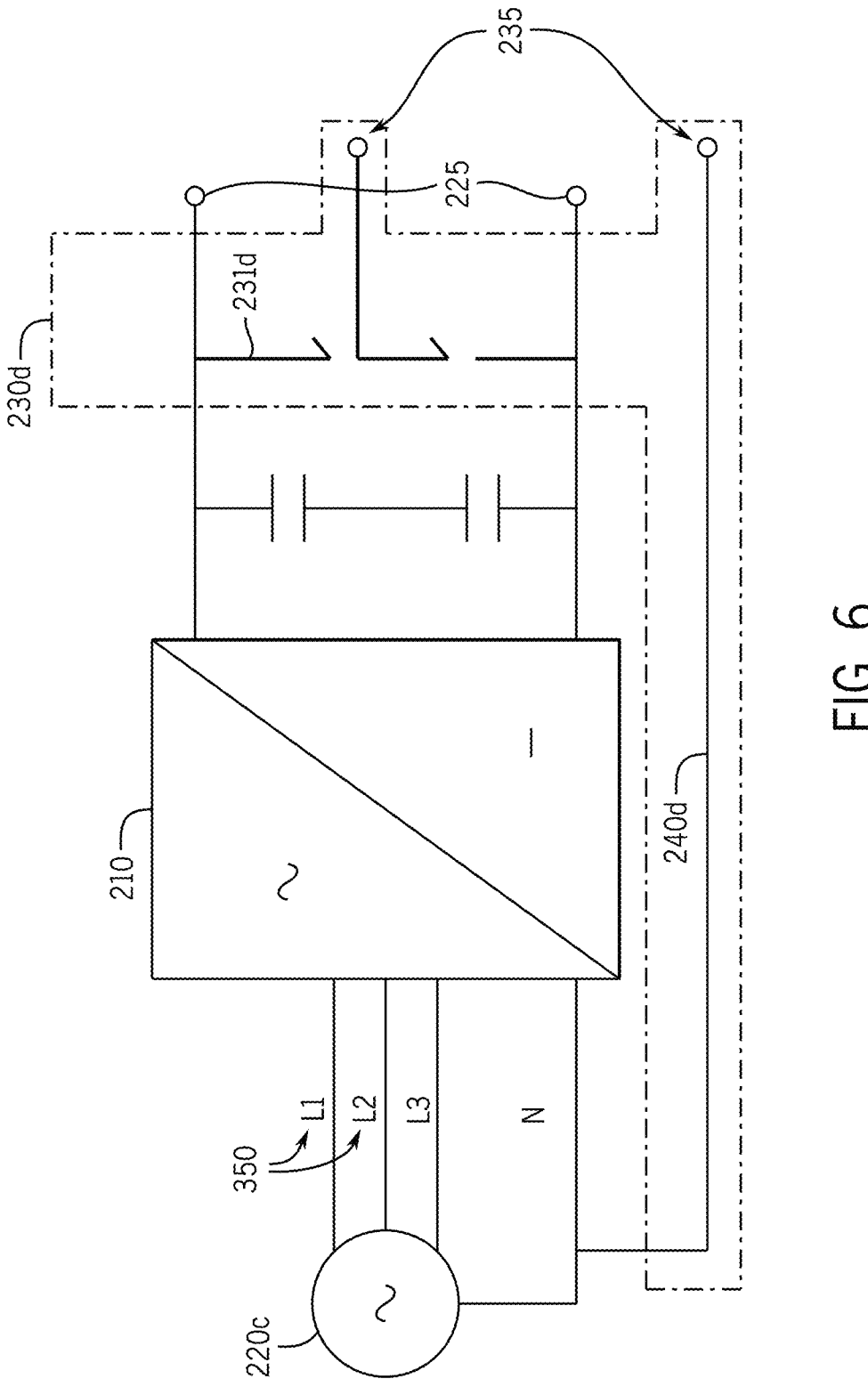
FIG. 6 is another block diagram of a vessel power system with an exemplary onboard battery charger configured to receive a multi-phase AC power input and generate a regulated AC output according to another embodiment of the present disclosure.

FIGS. 5 and 6 illustrate embodiments of the active phase circuits 230c, 230d wherein the AC power input 220c is a multi-phase input comprising a plurality of input phases 350 and the output is a single phase regulated AC output, The multi-phase input 220c exemplified here is a three phase AC input including three input phases L1, L2, L3, and a neutral input N. The return connection 240c, 240d may connect to any one of the plurality of input phases L1, L2, L3, or the neutral input N. Thus, the active phase circuit 230c, 230d is formed by the active phase leg 231c, 231d and one or more return connections to any one of the plurality of input phases 350. Where the regulated AC output is a single phase regulated AC output provided by one set of output connection points 235, as shown, the active phase circuit 230c, 230d includes one return connection 240c, 240d. In the example shown in FIG. 5, the return connection 240c connects to the input phase L1. In various embodiments, the return connection may be to any one of the input phase legs L1, L2, or L3. FIG. 6 exemplifies another active phase circuit configuration 230d providing a single phase regulated AC output formed by the active phase leg 231d and a return connection 240d connecting to the neutral input N.

In other embodiments, the regulated AC output may be two or more split phase outputs formed by two or more return connections, similar to that shown and described above in FIG. 4 except using the multi-phase AC input 220c shown in FIG. 5. In such an embodiment, connections for split phase outputs may include any combination of two or more return connections to any two or more of the input lines L1, L2, L3, or N). For example, the active phase circuit may include both the return connections 240c and 240d shown in FIGS. 5-6, including one return connection 240c to L1 and one return connection 240d to N, to provide two split phase regulated AC outputs.

Figure 7:
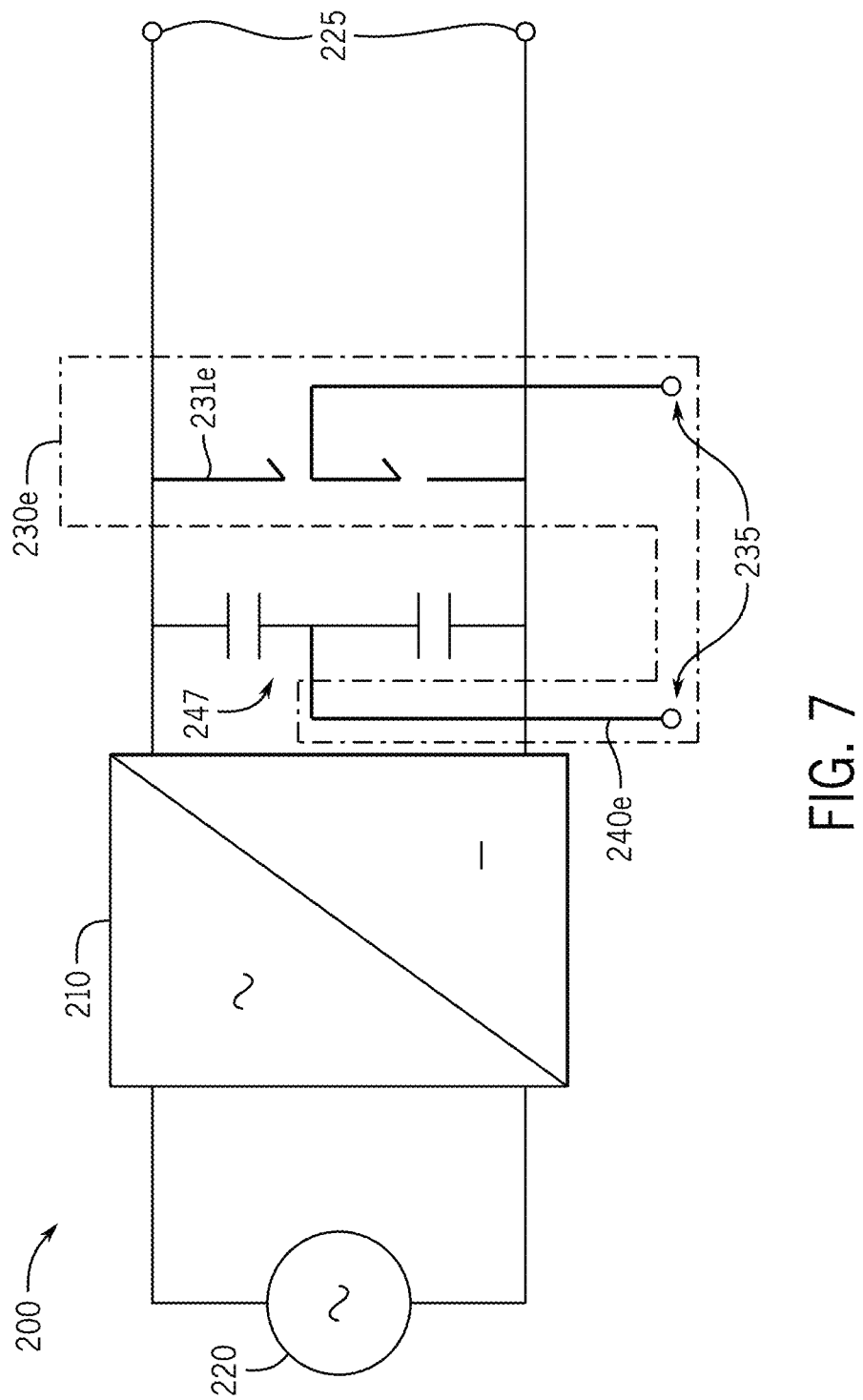
FIG. 7 is a block diagram of a vessel power system with an exemplary onboard battery charger configured to generate a regulated AC output according to another embodiment of the present disclosure.

FIG. 7 illustrates a vessel power system with an active phase circuit 230e generating a single phase regulated AC output at output points 235 formed by an active phase leg 231e and a return connection 240e connecting to a center point of a capacitor bank 247 at the output of the rectifier 210. The capacitor bank 247 is positioned between the rectifier 210 and the active phase circuit 230e, which is included in many OBC architectures. Accordingly, the active phase circuit 230e may be neutral forming. Thus, the embodiment can be utilized with and voltage type (e.g., single phase, split phase or multiphase) and any voltage rating.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A vessel power system configured for a marine vessel, the system comprising:
    a rectifier configured to receive an AC power input from a shore power source and provide a DC charging output to charge a battery;
    an active phase circuit configured to provide a regulated AC output to power onboard AC loads on the marine vessel, wherein the active phase circuit is connected to the output of the rectifier and includes a return connection configured to form a return path for electric current from the onboard AC loads; and
    wherein the rectifier and the active phase circuit are configured to split the AC power input from the shore power source into the DC charging output to charge the battery and the regulated AC output to power the onboard AC loads.

2. The system of claim 1, wherein the rectifier and the active phase circuit are positioned in a device housing configured to be mounted on the marine vessel.

3. The system of claim 1, wherein the active phase circuit comprises a half bridge comprising at least two semiconductor power switches and is in parallel with the DC charging output from the rectifier.

4. The system of claim 1, wherein the active phase circuit is configured to provide the regulated AC output regardless of a voltage or phase configuration of the AC power input.

5. The system of claim 1, wherein the regulated AC output is a single phase output at a predetermined voltage.

6. The system of claim 5, wherein the AC power input is a single phase 120V, 208V, 220V, or 480V input.

7. The system of claim 5, wherein the predetermined voltage of the regulated AC output is 120V and a predetermined frequency of the regulated AC output is 50 Hz or 60 Hz.

8. The system of claim 1, wherein the return connection connects to one phase of the AC power input.

9. The system of claim 1, wherein the AC power input is a multi-phase input comprising a plurality of input phases, and wherein the return connection connects to one of the plurality of input phases or a neutral input.

10. The system of claim 1, wherein the AC power input includes a neutral input and wherein the return connection connects to the neutral input.

11. The system of claim 1, wherein the active phase circuit is configured to provide two split phase outputs, each at a predetermined voltage.

12. The system of claim 1, wherein the active phase circuit is controllable to vary a split of input power from the AC power input between the regulated AC output and the DC charging output.

13. The system of claim 12, further comprising a controller configured to control a split of input power from the AC power input between the regulated AC output and the DC charging output.

14. The system of claim 13, wherein the controller is further configured to receive a user input indicating a user-desired power split, and wherein the controller is configured to control the split of the input power based on the user input.

15. An onboard battery charger configured to be installed on a marine vessel to receive an AC power input from a shore power source and to charge at least one battery on the marine vessel, the onboard battery charger comprising:

a rectifier configured to receive an AC power input from a shore power source and provide a DC charging output to charge the battery;

an active phase circuit configured to provide a regulated AC output to power an onboard AC load on the marine vessel, wherein the active phase circuit is connected to the output of the rectifier and includes a return connection configured to form a return path for electric current from the onboard AC load;

wherein the rectifier, the return connection, and the active phase circuit are configured to split the AC power input from the shore power source into the DC charging output to charge the battery and the regulated AC output to power the onboard AC load;

a charger housing configured to mount to the marine vessel, the charger housing comprising an input port configured to receive the AC power input, a DC output port configured to provide the DC charging output to the battery, and an AC output port configured to provide the regulated AC output to power the onboard AC load; and wherein the rectifier and the active phase circuit are within the charger housing.

16. The onboard battery charger of claim 15, wherein the active phase circuit comprises a half bridge comprising at least two semiconductor power switches and is in parallel with the DC charging output from the rectifier.

17. The onboard battery charger of claim 15, wherein the active phase circuit is configured to provide the regulated AC output regardless of a voltage or phase configuration of the AC power input.

18. The onboard battery charger of claim 15, wherein the return connection connects to one phase of the AC power input.

19. The onboard battery charger of claim 15, wherein the AC power input includes a neutral input and wherein the return connection connects to the neutral input.

20. The onboard battery charger of claim 15, wherein the active phase circuit is configured to provide two split phase outputs, each at a predetermined voltage.

* * * * *